United States Patent

Chen et al.

[11] Patent Number: 6,072,469
[45] Date of Patent: Jun. 6, 2000

[54] CURSOR POSITIONING DEVICE FOR COMPUTER SYSTEM

[76] Inventors: Mei-Yun Chen; Fu-Kuo Yeh, both of 3F, No. 2, Lane 42, Hou-Kang St., Shih-Lin Dist., Taipei, Taiwan

[21] Appl. No.: 08/900,372

[22] Filed: Jul. 23, 1997

Related U.S. Application Data

[62] Division of application No. 08/667,897, Jun. 20, 1996, Pat. No. 5,704,037.

[51] Int. Cl.[7] ................................................. B09G 5/08
[52] U.S. Cl. ........................ 345/157; 345/145; 345/159
[58] Field of Search ................................ 345/156–167, 345/145; 341/22

[56] References Cited

U.S. PATENT DOCUMENTS

| | | | |
|---|---|---|---|
| 5,012,231 | 4/1991 | Felsenstein | 345/159 |
| 5,191,641 | 3/1993 | Yamamoto et al. | 345/159 |
| 5,568,164 | 10/1996 | Ogawa | 345/145 |
| 5,771,037 | 6/1998 | Jackson | 345/145 |
| 5,870,079 | 2/1999 | Hennessy | 345/145 |

*Primary Examiner*—Dennis-Doon Chow
*Attorney, Agent, or Firm*—Pro-Techtor International Services

[57] ABSTRACT

A cursor control device for controlling the movement and positioning of a cursor on a computer includes a finger controllable member formed on the cursor positioning device. The cursor on the display is controllable either in X-axis or Y-axis direction by means of sliding the finger controllable member on the device. The cursor positioning device includes a displacement detecting structure for detecting the movement of the finger controllable member, and photo encoder detectors for detecting the operating situation of the X-axis and Y-axis photo encoders which are arranged in 90 degrees phase deference in space. In such an arrangement, the displacement of the finger controllable member in X-axis and Y-axis direction may be detected as coordinate date. The detected coordinate data is transmitted to a control circuit for further processes and then sent to a computer device.

5 Claims, 16 Drawing Sheets

CURSOR POSITIONING DEVICE FOR COMPUTER SYSTEM

This is a Divisional application of applicant's U.S. patent application Ser. No. 08/667,897, filed on Jun., 20, 1996, now U.S. Pat. No. 5,704,037.

BACKGROUND OF THIS INVENTION

1. Field of the Invention

The present invention relates to a two dimensional data input device for a computer system, and more particularly to a cursor positioning device for controlling the movement and positioning of a cursor on a computer display.

The present invention is a further improved cursor-positioning device of my PCT Application Numbers PCTCN950042 and PCTCN950043.

2. Description of the Prior Art

The conventional cursor control devices or cursor positioning devices for a computer monitor include keyboard, mouse, trackball, touch screen, light pen, and so on. These prior art cursor positioning devices are widely used to control the cursor movement and positioning of the cursor or mark on the computer display. Nowadays, these prior art cursor-positioning devices are also widely applied to a computer system as a function selection device to simply perform specific function on menus for a computer application program.

However, it is found that these conventional cursor-positioning devices are not very convenient in performing the cursor moving operation. For example, the well-known computer keyboard suffers from significant slow performing speed during controlling the cursor movement. It is also noted that the computer mouse is not convenient in cursor movement because the user must move the mouse within a large square area on a mouse pad or a smooth desk by moving his arm repeatedly. In addition, the conventional computer mouse typically includes a downward rotable ball and two encoder wheels to detect the movement of the mouse, which always suffers from contamination, causing poor performance reliability.

In order to overcome the drawbacks found in the conventional cursor positioning devices, "Absolute Axis Coordinate" type computer pointing devices are disclosed in U.S. Pat. Nos. 4,782,327 and 4,935,728. However, both the prior art U.S. patents have a relatively larger structure size with a complicated control circuit interface and a complicated control procedure to achieve the cursor moving control purpose.

One important problem of the prior art is described below. The typical horizontal resolution of the computer screen may be 640, 800 or 1280 pixels. During slow movement operation mode of the prior art, the cursor on the screen is operated in a pixel-to-pixel operation mode, i.e. fine displacement mode. In case that the finger controllable member of the pointing device moves 320 pixels, the cursor on the screen only moves half of the total traveling distance of the screen or less. At this time, in case that the user changes the operation mode of the pointing device from the initial slow operation mode to a fast movement operation mode, the cursor on the screen will directly jump to the forward margin on the screen or move over 640 pixels. It is to be understood that the prior art has disadvantage of suddenly jumping feature, causing sudden change operation feeling during moving operation. Because the distance of the cursor moving on the display is equal to a product of a distance of the cursor from an edge of the display area of movement times a quotient of a detected distance of movement of the finger-grippable element divided by a distance of the finger-grippable element from an edge of the pointer area of movement, so it is possible to get a fraction during operation.

The former method will tire the user due to the length of the finger controllable member is increased, especially the operating range is limited in left and right direction in movement. The second method above will has problem that it can not correctly generate a signal at each moving time because that the distance is decreased causing a small effective displacement. Moreover, it is possible to cause a problem that the pointing device generates two or three pulse signals at each moving time. The design of shorten the distance of photo encoder can reduce the operating ranges of user hand during moving the finger controllable member, and it is especially applicable in use of remote controller for a multi-media system with more convenience and comfort.

The moving speed of the movable photo encoder of the present invention is designed to be proportional to the displacement of the movable photo encoder. So, it is highly possible to control the cursor within a small operating region of 16 mm, by reducing the length of the movable photo encoder, i.e. reducing the operation distance of the finger controllable member, under control of firmware.

SUMMARY OF THE INVENTION

Consequently, in view of the drawbacks of the prior art cursor control device, the primary object of the present invention is to provide a cursor control device for controlling the positioning and movement of a cursor on a computer screen. The control device is capable of conveniently control the movement of the cursor on the computer screen by using absolute coordinate control technique. In the design of mechanism of the present invention, the photo detector and movable photo encoder, and the whole-required operating space are reduced, capable of installing the X-axis and Y-axis movable photo encoder at the same plane to reduce the thickness of the mechanism. This design is especially applicable in known notebook computer. Further, the photo detector may be arranged at the central portion of the mechanism, so it is unnecessary to reserve an square opening on the device, nor to prepare a cover plate to cover the opening. Obviously, the operating space and thickness of the mechanism of the present invention may be reduced in application of installing on a known keyboard or a notebook computer without need of cover plate. The advantages of the present invention are as follows:

1. The mechanism of the present invention has good waterproof and dust-proof effective when associated with a computer keyboard or a notebook computer.
2. The required operating area for the cover can be reduced. The length of the cover plus operating distance is three times that of the finger controllable member. The operating area of the cover is nine times the displacement area of the finger controllable member. The required area of the cursor positioning device of the present invention on the keyboard can be reduced. Particularly, the required area of the movable photo encoder of a preferred embodiment as shown in FIG. 6 can be reduced one ninth of the prior art cover plate.
3. The area of the movable photo encoder can be reduced to half or one forth of the prior arts.
4. The movable photo encoder and fixed photo encoder are combined together by a stack structure to generate a series of pulse signals. It is applicable in a fine operation, for example, within a small range of 25.4 mm/320=0.08 mm, capable of generating 320 pulse signals per dot. In such a small distance, the prior art must use expensive and precise lighting source, such as laser LED, for detecting operation, because the conventional LED has problem of light diffusion during transmitting light beam. The present invention is provided with a fixed calibrating photo encoder. The mask sections and transparent sections of which is designed to correspond to the movable photo encoder and the location of the phases A and B of the photo encoder is arranged to one fourth of a period, so that the photo encoder itself is capable of generating a very precise two phase signals with 90 degrees phase difference. The fixed calibrating photo encoder is preferably attached onto the movable photo encoder to reduce the gap therebetween. Alternatively, the fixed calibrating photo encoder may be directly printed on the movable photo encoder. In such an arrangement, the present invention can use the conventional LED as a lighting source. In effectiveness, the present invention has advantage of simplifying calibrating process, saving time of adjusting the location of the LED, and reducing the components cost.

5. The conventional mouse has problems of uncertain friction on the X-axis and Y-axis shaft of the encoder, causing error and loss of signal. The movable photo encoder of the present invention has no rotating shaft like the conventional computer mouse, so it can overcome the problem of the conventional mouse.

6. The present invention provides two methods to detect the margin of the finger controllable member. A preferred method to detect the margin is directly formed a margin mark on the movable photo encoder, in order to simply provide a digital form for determination. So, the control procedure is simpler and the manufacturing process is easier than that of prior art.

7. The present invention is provided with margin mark thereon. The movable photo encoder of a preferred embodiment in accordance with the present invention not only has a margin mark, but also has a single lighting source with two phase signals A and B with 90 degrees phase difference. The present invention is possible to be operated within a 16 mm operating area under control of a universal operation mode. In the operation mode, the displacement of the cursor on the display is proportional to that of the finger controllable member. Even when the resolution of the display is changed, the operation mode is still applicable to achieve precise control purpose. Besides, the movement of the cursor is very smooth. No matter where the cursor is moved to any points on the display, it still can get fine displacement around the point where the cursor is located. The present invention also can move the cursor to reach a margin of the display precisely and return to original position fast, under control of the finger controllable member.

8. The location of the cursor on the display may always correspond to the position of the finger controllable member on the cursor positioning device, which can providing a very useful pointing device for the user.

9. The displacement of the cursor on the display is proportional to the distance of the finger controllable member on the cursor positioning device. The moving speed of the cursor on the display also corresponds to the different moving speed of the finger controllable member, resulting a smooth movement on the display. So, the present invention can overcome the problem of jumping movement of the cursor as the prior art U.S. Pat. No. 4,935,728.

10. The present invention determines the proportion factor of the displacement of the cursor according to the moving speed increment of the finger controllable member.

11. The present invention can set an effective area, such as within a range of 16 mm or less, for the movement of the finger controllable member. In such a design, it is possible to move the cursor over the whole display area by operating the finger controllable member. So, it can improve the convenience over the prior art, such as a conventional track ball that needs to rotate the ball with various turns during operation to move the cursor over the display.

These and other objects and features of the invention will become more apparent from the following description taken in connection with the accompanying drawings.

BRIEF DESCRIPTION OF THE DRAWINGS

FIGS. 4A to 4F show the structure and associated waveform of a photo detector embodiment using four sets of photo transistors in accordance with the present invention;

DETAILED DESCRIPTION OF THE PREFERRED EMBODIMENT

Figure 1:
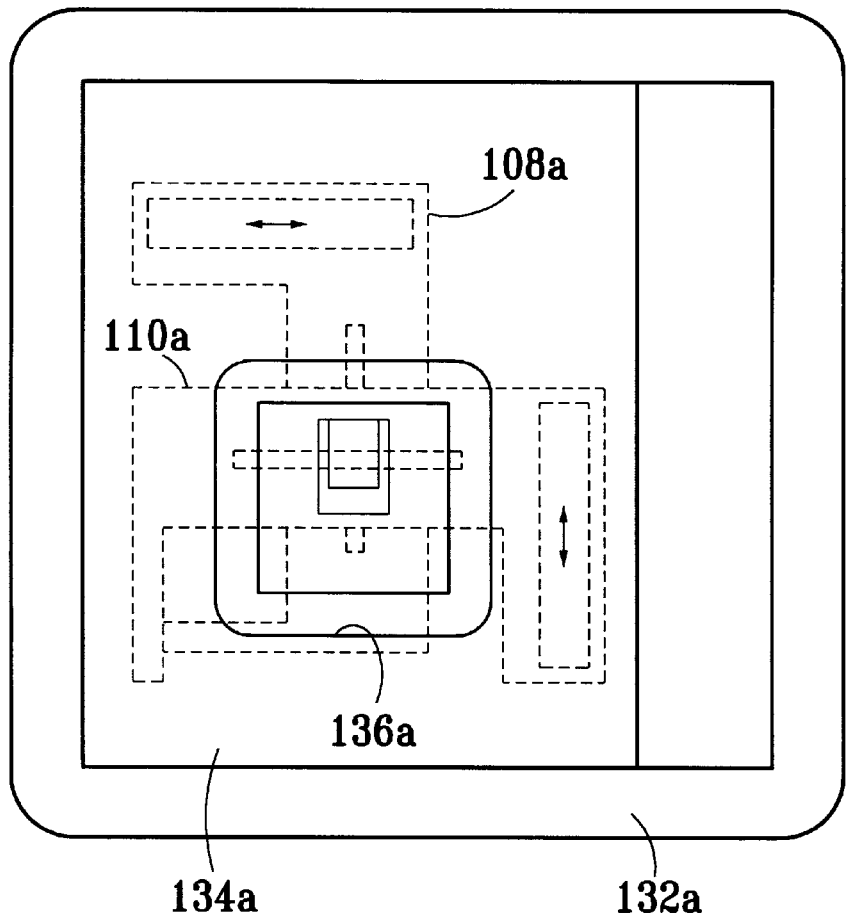
FIG. 1 is a top plan view of the pointing device of prior art.
Figure 2:
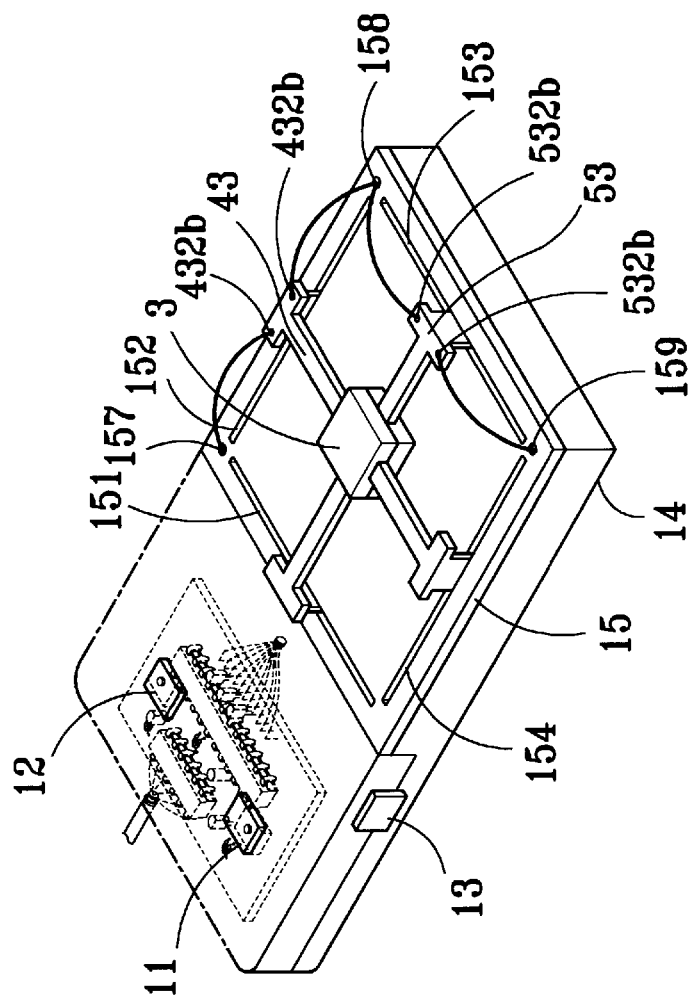
FIG. 2 is a perspective view showing the ninth embodiment of the cursor positioning device of the present invention.
Figure 3:
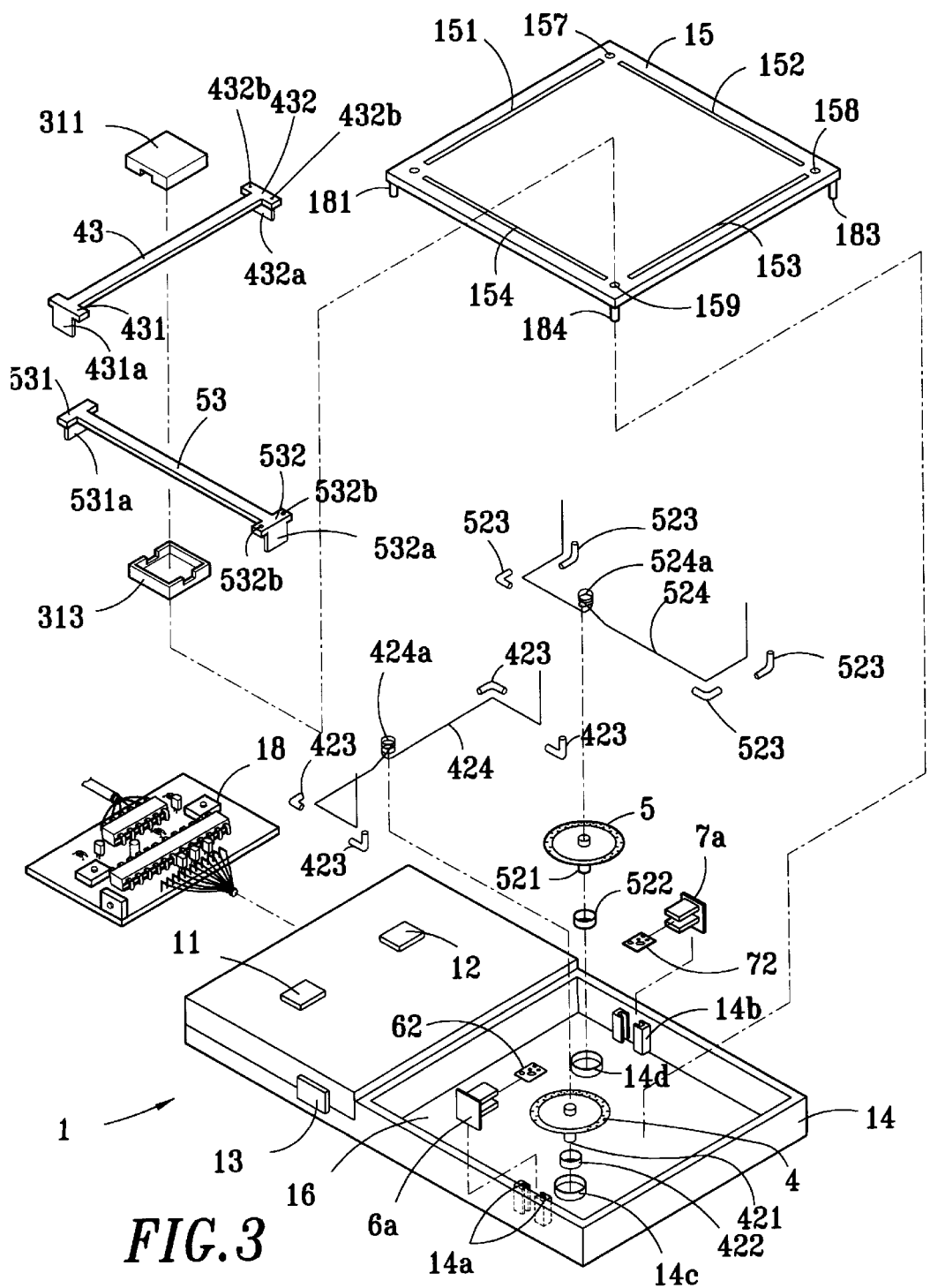
FIG. 3 is an exploded view of the embodiment shown in FIG. 2.

FIG. 2 shows a perspective view of the cursor positioning device in accordance with the ninth embodiment of the present invention. FIG. 3 shows the exploded view of the cursor positioning device show in FIG. 18, the upper housing 15 is provided with three through holes 157, 158, and 159 instead of four through holes. Besides, both the X-axis photo encoder 4 and the Y-axis photo encoder 5 are designed to have a disc structure with circular encoder. The shaft 421 of the X-axis photo encoder 4 with a ball bearing 422 is located at a bearing seat 14c. A guiding wire 424 having a central winding portion 424a winds around the shaft 421 of the photo encoder 4. Its two ends are fasten to a pair of fastening holes 532b of the Y-axis slidable bar 53 respectively via several guide tubes 423 and through holes 158 and 159. Similarly, the shaft 521 of the Y-axis photo encoder 5 with a ball bearing 522 is located at a bearing seat 14d. A guiding wire 524 having a central winding portion 524a winds around the shaft 521 of the photo encoder 5. Its two ends are fasten to a pair of fastening holes 432b of the X-axis slidable bar 43 respectively via several guide tubes 523 and through holes 157 and 158. A photo detector 6a with a calibrating photo encoder 62 is mounted on a vertical seat 14a closed to the position of the X-axis photo encoder 4, so as to detect the rotation of the X-axis photo encoder 4. A photo detector 7a with a calibrating photo encoder 72 is mounted on a vertical seat 14d closed to the position of the Y-axis photo encoder 5, so as to detect the rotation of the Y-axis photo encoder 5. When the user moves the X-axis slidable bar 43 and Y-axis slidable bar 53 by operating the finger controllable member 3 which is composed of an upper case 311 and a lower case 313, the photo encoders 4 and 5 will rotate. The X-axis photo detectors 6a and Y-axis photo detector 7a are capable of detection the rotation of the photo encoders 4 and 5 respectively, and the detected movement signal is transmitted to the control circuit board 18 for further processes. Because both the photo encoders 4 and 5 of this embodiment are in a circular form, it requires smaller operating space comparing to the previous embodiments described above.

Table I is a state table which shows when a computer system connected with the cursor positioning device of the present invention receives the signals XA and XA. The computer can determine the moving direction X+ or X- of the positioning device according to the binary value of the signals XA and XB. The computer may get a flag Xmax and a flag Xmin according to the signal X+ and X- respectively, and then store the status of the flags into a register.

TABLE I

|  | 1 | 2 | 3 | 4 |
|---|---|---|---|---|
| XA | 0 | 1 | 1 | 0 |
| XB | 0 | 0 | 1 | 1 |
| X+ direction | | | | |
| XA | 1 | 1 | 0 | 0 |
| XB | 0 | 1 | 1 | 0 |
| X− direction | | | | |
| XA | 0 | 0 | 1 | 1 |
| XB | 1 | 0 | 0 | 1 |
| Xmax | 1 | | | |
|  | 1 | | | |
| Xmin | 0 | | | |
|  | 0 | | | |

Flag: Xman Xmin X+
Register: Xreg, X+reg, X−reg, Xmax reg, Xmin reg

The present invention may use four phototransistors structure as shown in FIGS. 4A to 4F, instead of two phototransistors embodiment as described above. The fixed photo encoder 62a has a wider mask section 62aa, the width of which is 1.5 times the other mask section or transparent section of the fixed photo encoder 62a. When the photo transistors 63a and 63b moves, the computer may determine the moving direction of the movable photo encoder according to the binary value detected by the photo transistors, under control of the control circuit. In addition, the movable photo encoder 4a has two end mask sections 4aa and 4ab at two ending margin thereof. The width of the end mask sections is two times the other mask section or transparent section of the movable photo encoder. So, the phototransistors 63a and 63c have same phase when the movable photo encoder 4a does not reach margin area. The photo transistors 63a and 63c has contrary phase when the end mask section 4 reaches to a position between the photo transistor 63c and 63a. Therefore, the present invention may determine whether the movable photo encoder reaches the maximum limited margin Xmax. Similarly, the minimum Limited margin Xmin may be determined by detecting whether the other end mask section 4ab reaches the area between the photo transistors 63b and 63d.

Figure 4A:
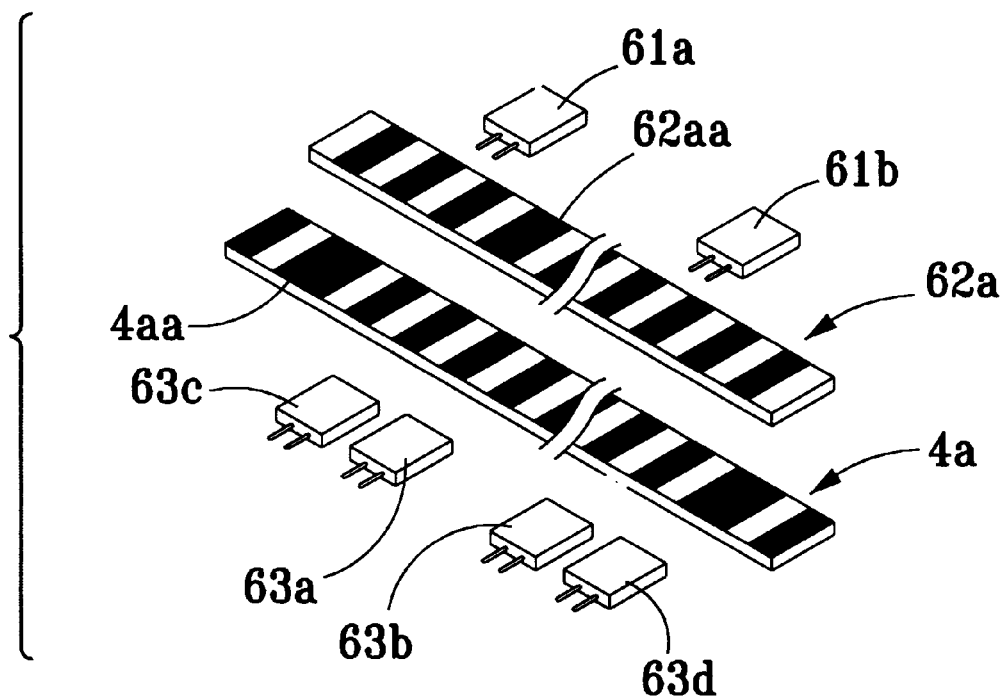
Figure 4B:
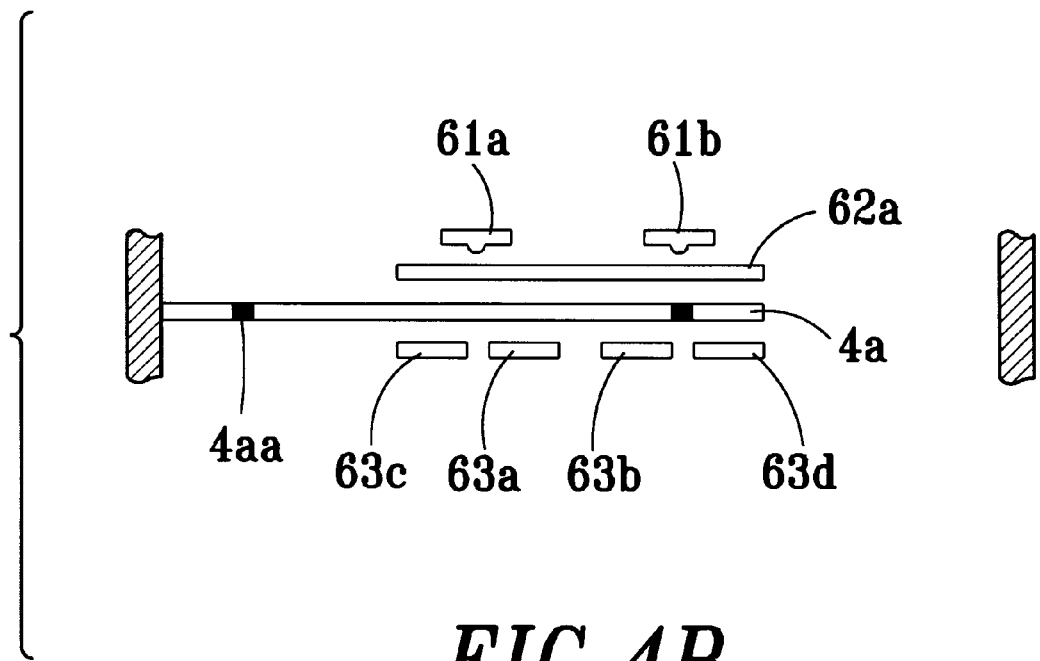
Figure 4C:
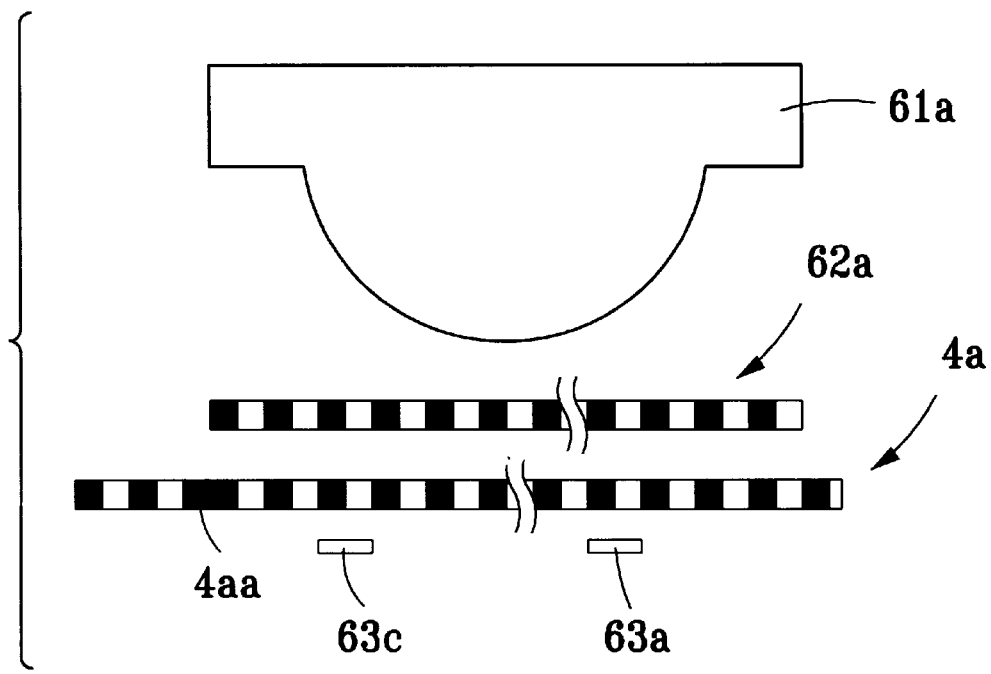

FIG. 4C further shows a top plan vies of the LED 61a, the fixed photo encoder 62, the movable photo encoder 4a, and the phototransistors 63c and 63a of FIG. 4A.

Figure 4D:
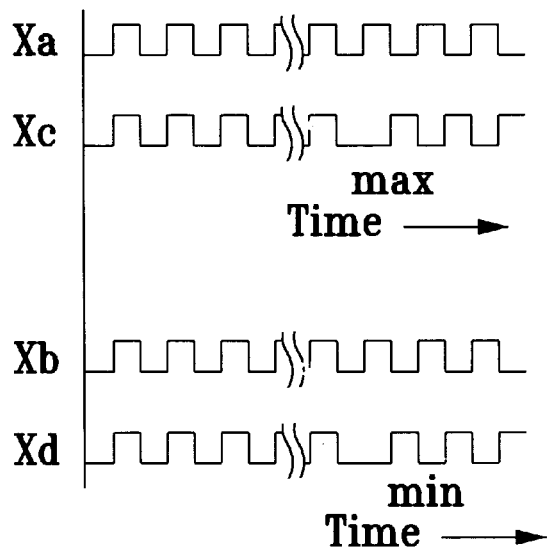
Figure 5A:
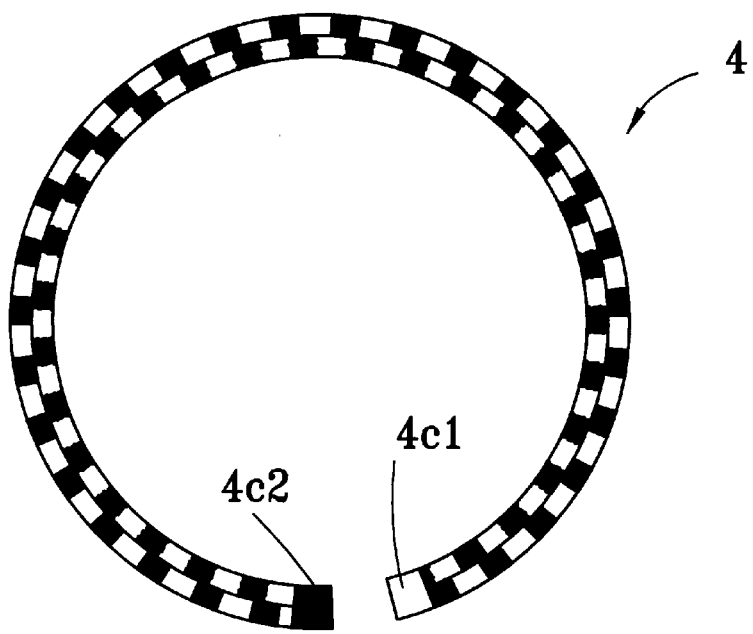
FIGS. 5A to 5D show the structure of the photo detector applied to the ninth embodiment of the present invention.
Figure 5B:
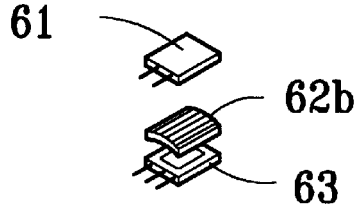
Figure 5C:
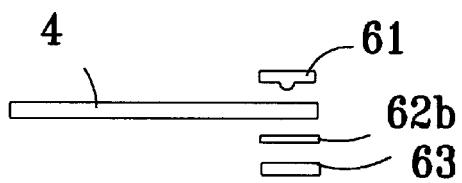
Figure 5D:

FIG. 4D shows a series of X-axis signal pulses generated by the arrangement shown in FIG. 4C. The X-axis signals XA, XB, XC, and XD in a form of binary value will be supplied to the control circuit board 18. The present invention may easily determine the moving direction and margin according to the binary value. Because the signals are obtained from the movable photo encoder, the control circuit, and the firmware, so it is possible to simplify the control program and control circuit. As to the operation of the Y-axis, it is the same as the X-axis operation described above.

FIG. 4E shows the second embodiment arrangement of the photo encoder in accordance with the present invention, which is similar to the embodiment shown in FIG. 4C, except for the design of the fixed photo encoder 62a. As shown in the drawing 4A, a double width mask section 62aa is further positioned between the phototransistors 63c and 63a. The width of the mask section is two times the mask section or transparent section of the fixed photo encoder 62a. In such an arrangement, the phototransistors 63C and 63a will generate contrary phase signal when the positioning device of the present invention does not reach margin. On the contrary, the photo transistors 63c and 63a will generate the same phase signal when the positioning device reaches margin, by detecting whether the double width mask section 62aa enters a region between the photo transistors 63c and 63a.

FIG. 4F shows the third embodiment arrangement of the photo encoder in accordance with the present invention, which is also similar to the embodiment shown in FIG. 4C, except for the design of the movable photo encoder 4a and the distance between the photo transistors 63c and 63a. As shown in the drawing, a narrow separation in space exists between the phototransistors 63a and 63c, corresponding to the distance of two mask sections or two transparent sections of the movable photo encoder 4a. In such an arrangement, the output signals generated by the transistors 63c and 63a have the same phase when the movable photo encoder does not reach margin. On the contrary, the output signals generated by the transistors 63c and 63a have contrary phase when the movable photo encoder reaches margin.

FIGS. 5A to 5D show a preferred photo encoder structure suitable to be used by the ninth embodiment of the present invention described above. The photo encoder 4 is in a circular form. One end of the circular photo encoder is formed as a transparent section 4c1, while the other end thereof is formed as a mask section 4c2, for the purpose of determining the left margin Xmin and the right margin Xmax. In addition, the circular photo encoder 4 is composed of two circular patterns, the outer circular pattern is used to generate the signal XA and the inner circular pattern is used to generate the signal XB. The margin signals in a digital form may be directly generated by detecting the movable photo encoder, so that the control program of the cursor positioning device is rather simple.

Figure 6:
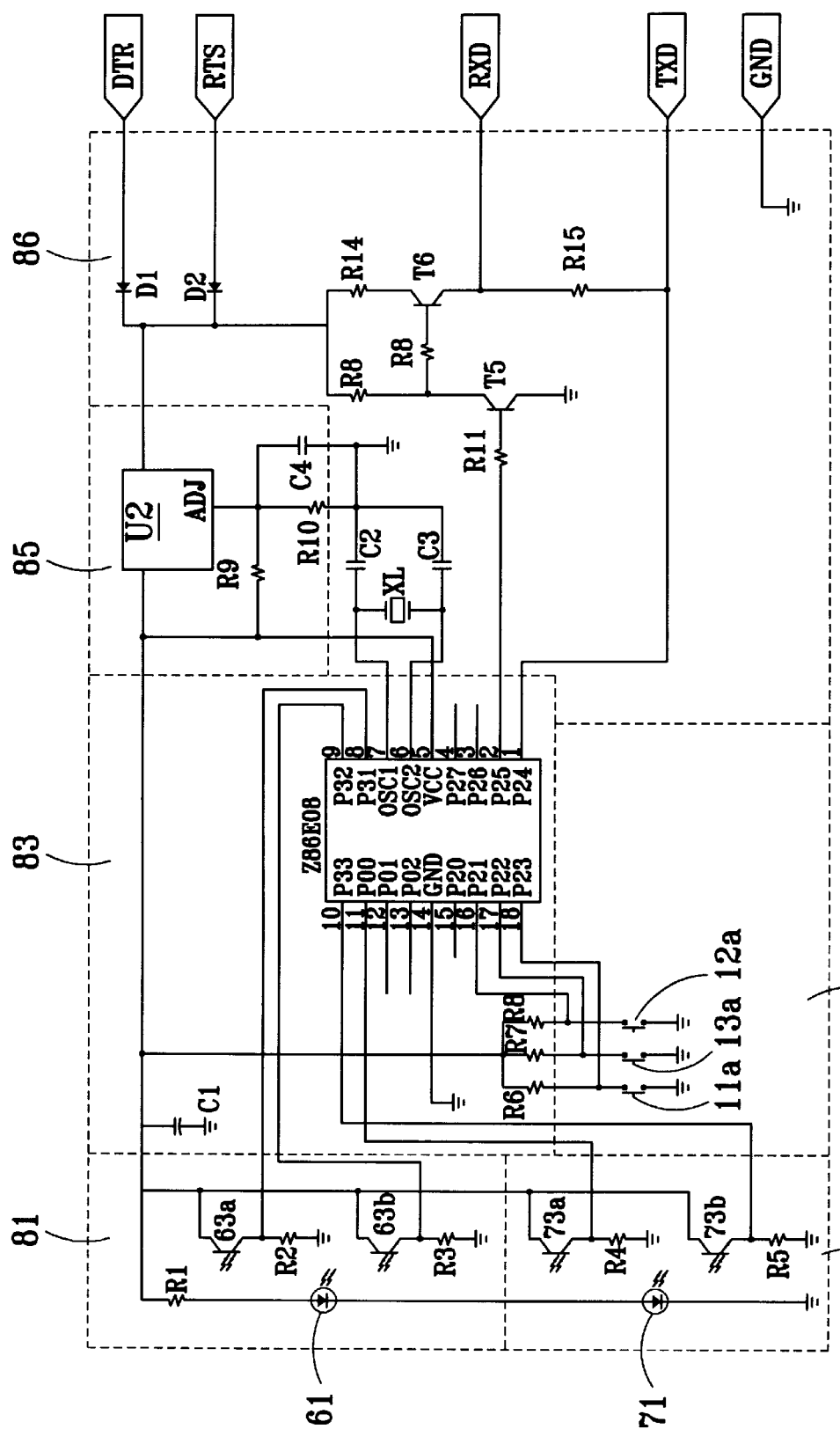
FIG. 6. is a control circuit suitable to apply to the photo detector
Figure 7A:
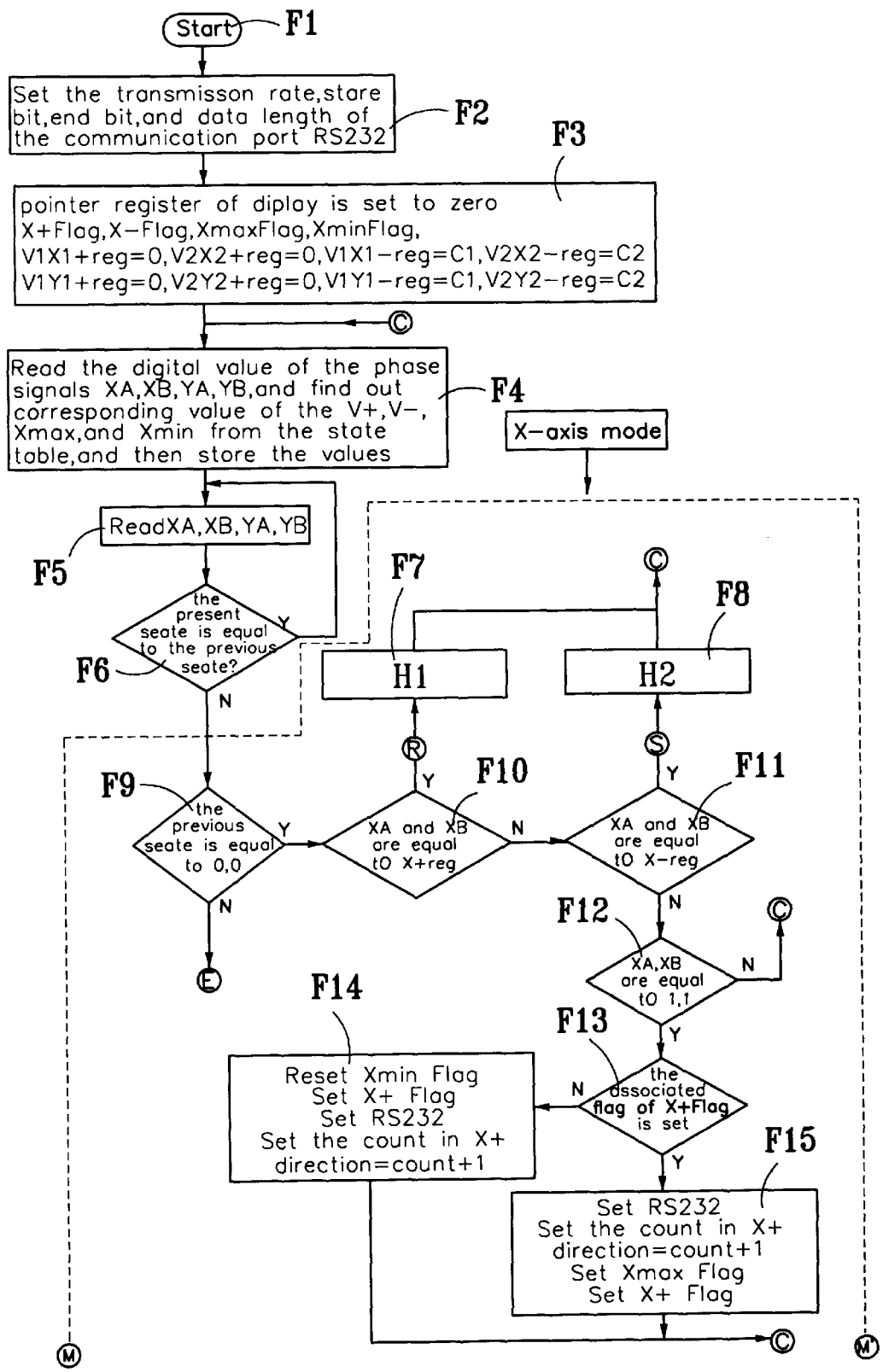
FIGS. 7A to 7E are control flow charts for the control circuit shown in FIG. 6.
Figure 7B:
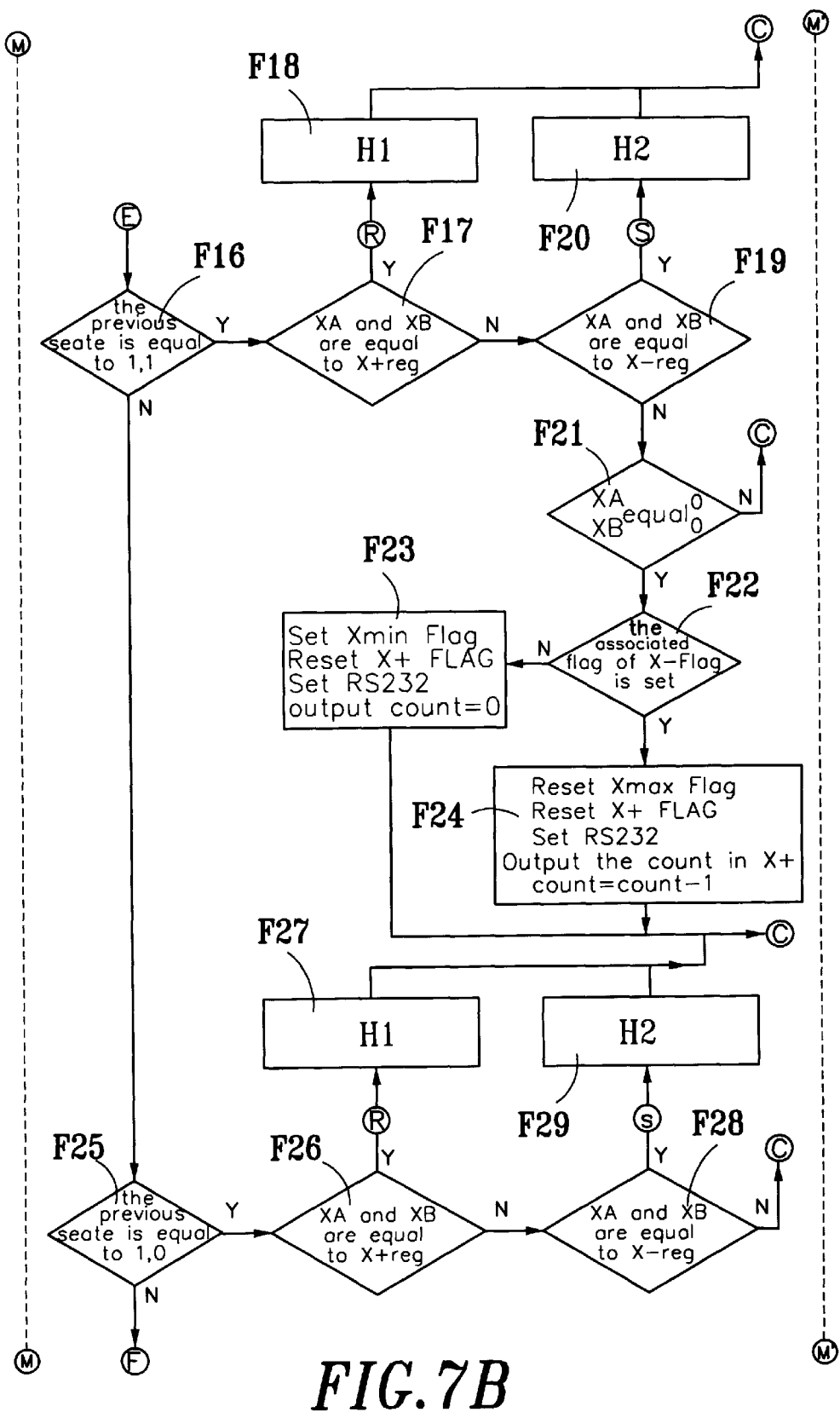
Figure 7C:
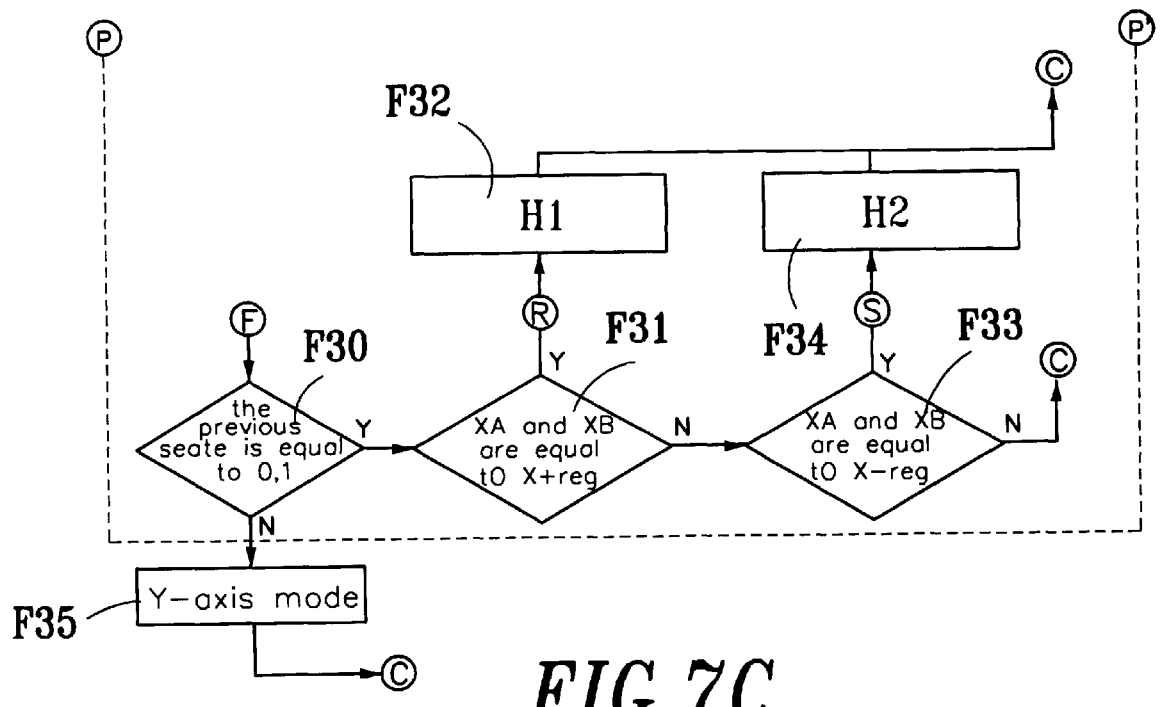

FIG. 6 is a detail control circuit diagram with two sets of photo detecting circuits. X-axis photo detecting circuit 81 includes a LED 61 for generating a light beam. A first photo transistor 63*a* may detect the light beam and then output a phase signal XA, and the second transistor 63*b* may also detect the light beam and then output a phase signal XB. Similarly, A Y-axis photo detecting circuit 82 includes a LED 71 for generating a light beam. A first photo transistor 73*a* may detect the light beam and then output a phase signal YA, and the second transistor 73*b* may also detect the light beam and then output a phase signal YB. The detected S-axis and Y-axis phase signals are supplied to a processing circuit 83 for further processes. A switch circuit 84 is electrically connected to the processing circuit 83,which includes a left switch 11*a*, a right switch 12*b*, and middle Switch 13*c*. The control circuit is provided with a voltage regulating circuit 85 for supplying a stable power source. An output circuit 86 is used to amplify the output signal supplied from the processing circuit 83 and then supply the amplified output signal to a host computer (not shown) via transmission lines. Referring to FIG. 7A, the computer first set the transmission rate, start bit, end bit, and data length of the communication port RS232 in step F2, followed by performing system initialization step F1. In step F3, all flag status, registers, and associated value for determination of operating speed is cleared. Thereafter, the computer reads the digital value of the phase signals XA, XB, YA, and YB, and finds out corresponding value of the X+, X−, Xmax, and Xmin from the state table of TABLE I as listed previously (only show the state of X-axis), and then stores the values for further comparison. The computer will reads the values XA, XB, YA, and YB again in step F5, and then compares these values with the first read values, to determine whether the status is changed or not. If the status is not changed, it indicates the finger controllable member of the cursor positioning device has no movement, and the procedure will return to read the XA, XB, YA, and YB again. On the contrary, if the status is changed, a X-mode determination procedure outlined by dot line as shown in FIG. 27A is performed. There are four possible statuses i.e. (0,0), (1,0), (1,1) and (0,1) to be compared with the pervious status. The computer may get the information about the moving speed of the cursor positioning device by calculating the time of changing of the various statuses. Typically, the system clock of the computer is ranged from 4 to 8 MHz nowadays. In practice, it is found that the normal operating speed that the user moves the finger controllable member of the cursor positioning device is below 5 KHz. Therefore, the computer may easily detect the operating speed of the cursor positioning device.

The computer may determine the position of the cursor with reference to TABLE I above and at first, the computer supposes the previous status is (0,0) in step F9. In case that XA=1 and XB=0, it indicates the finger controllable member is moved to direction x+, while in case that XA=0 and XB=1, it indicates the finger controllable member is moved to direction X−. In case XA=2 and XB=1, it indicates the finger controllable member either reaches a minimum limit or maximum limit dependent on whether the flag X+flag is set or not. After these determinations, various flag status S+, Xmin, Xman, etc. are obtained, and then these flag status are accumulated in predetermined registers for further judgment for the control program. So, in practical operation, the user just simply moves the finger controllable member to the left upper corner of the device to perform zero position initialization, and them the device can generate correct X-axis and Y-axis absolute coordinate values.

Figure 7D:
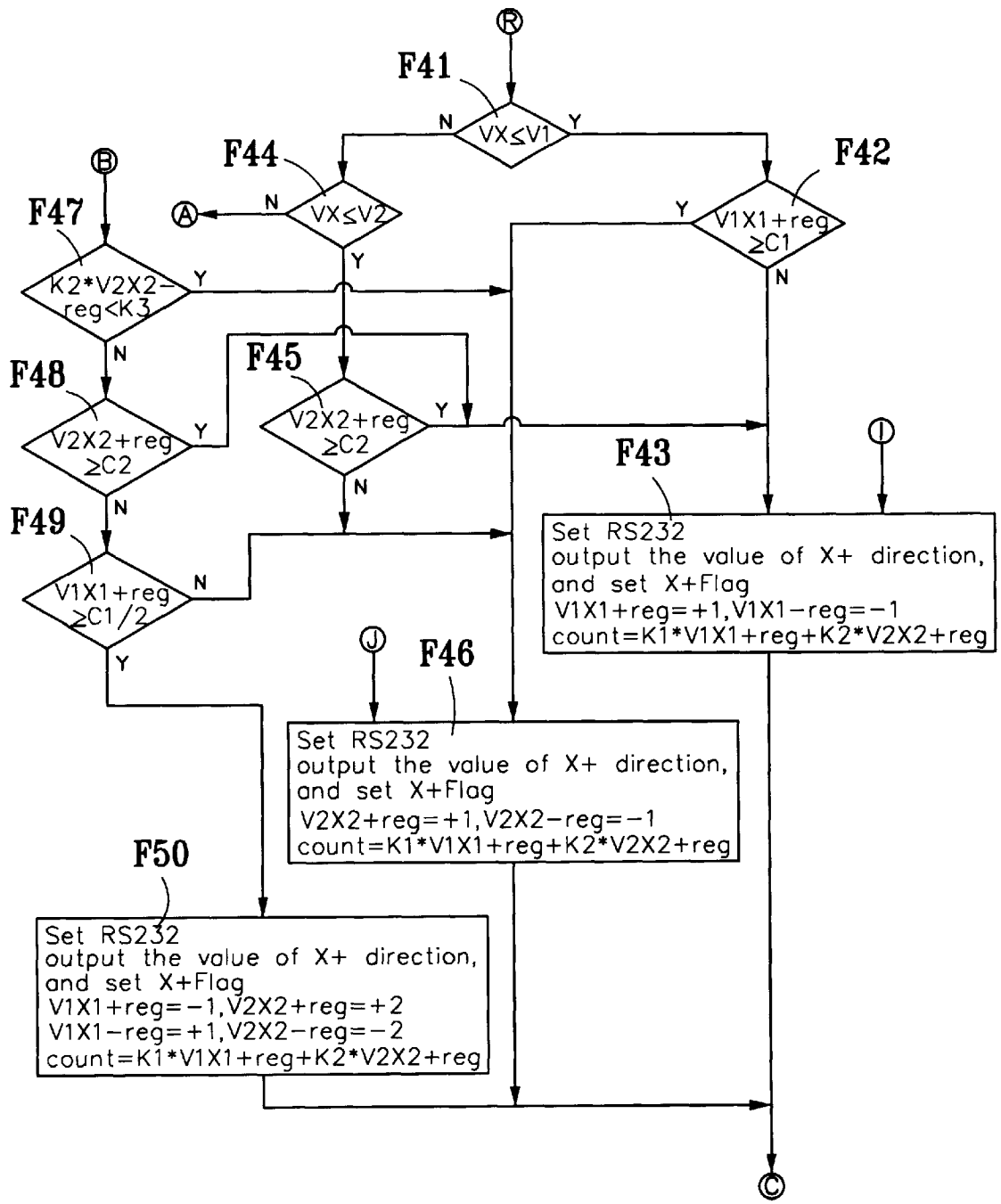
Figure 7E:
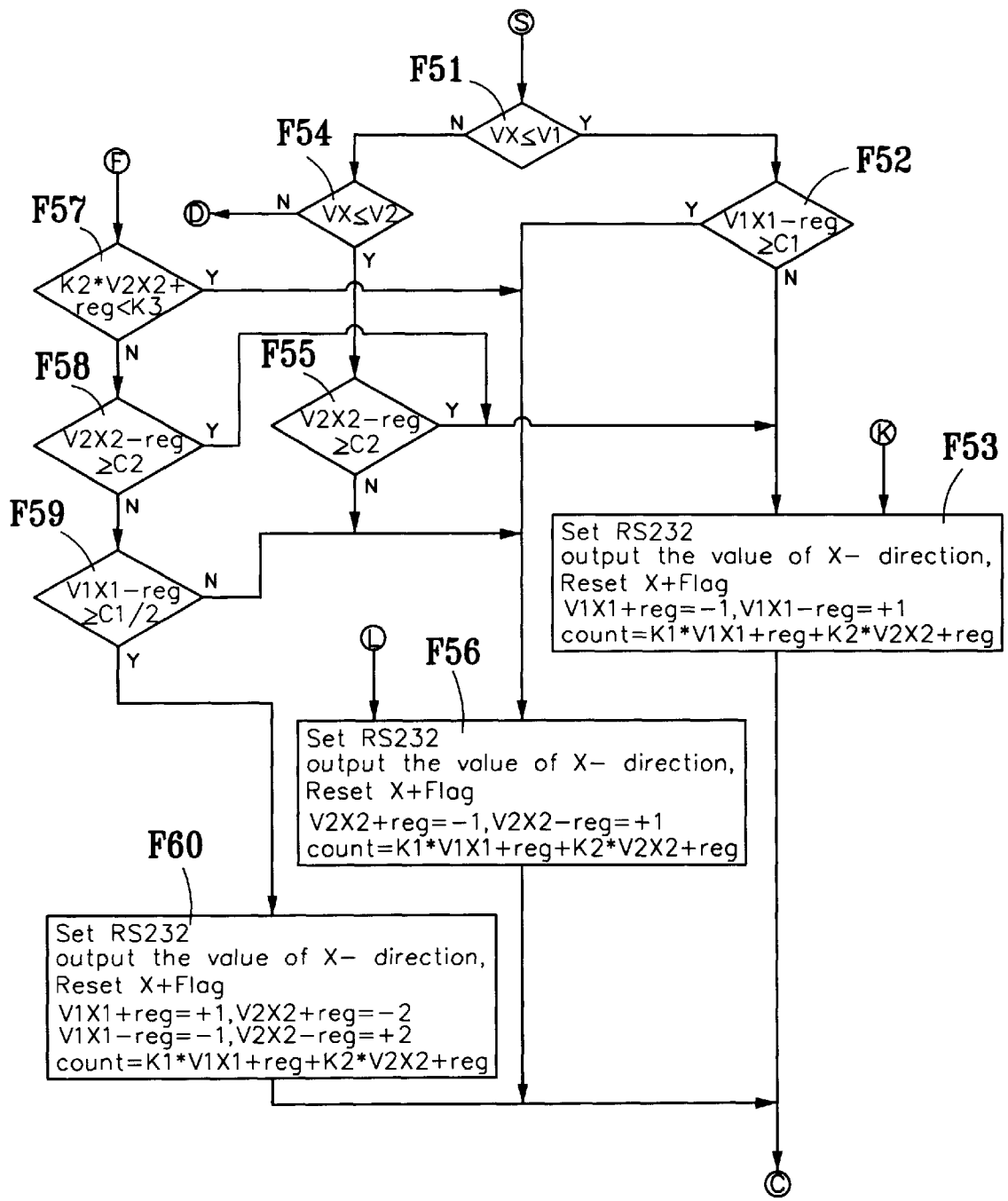

FIG. 7D is a subprogram flow chart of the control program, explaining how the cursor is moved to positive direction, while FIG. 7E is a subprogram flow chart of the control program, explaining how the cursor is moved to the other direction. The displacement of the cursor moving on the computer display is proportional to the moving distance of the finger controllable member. The factor of the proportion depends on the moving speed of the finger controllable member. The purposes of these procedures are as follows:

1. To limit the displacement of the finger controllable member to a range about 16 mm or less. Inspitefully, the short displacement and the different moving speed of the finger controllable member do not effect the movement of the cursor representing on the computer display. So, the present invention is impossible has problems of the prior art that the finger controllable member already reaches a margin of the positioning device but the cursor not reaches a corresponding margin on the computer screen; nor the finger controllable member not yet teaches a margin of the positioning device but the cursor already reaches a margin on the computer screen.
2. When the cursor on the display moves to any desired position thereon, there are necessary fine displacements around the position.
3. The moving speed and located position of the cursor on the display can always match that of the finger controllable member, resulting of a smooth, fast, and precise movement in operation.
4. The finger controllable member in each axis, for example X− axis, has two registers for positive directional performance and two registers for negative directional performance. The respective value recorded in the positive and negative registers is mutual associated, so that the finger controllable member may return to its original point and the cursor on the display may also return to its original point.

The various symbols used in the control program flow chart are defined in TABLE II as follows:

TABLE II

VX represents the operating speed of the finger controllable member, and also provides a predetermined value as a reference value for speed determination.

V(n) represents the different moving speed of the finger controllable member and the setting of speed level reference value.

C1 represents the maximum displacement of the finger controllable member at minimum speed level.

C2 represents the maximum displacement of the finger controllable member at second speedlevel.

C represents the combined displacement of the finger controllable member, C1+C2=C.

K(n) represents various reference constants at different speed level and the mutual relationship of various speeds of the finger controllable member.

V(n)X(n) represents the displacement of the finger controllable member at different speed level.

V1X1+reg is a register for registering the displacement of the finger controllable member in positive direction at lowest speed level.

V2X2+reg is a register for registering the displacement of the finger controllable member in positive direction at the second speed level.

V1X1-reg is a register for registering the displacement of the finger controllable member in negative direction at lowest speed level.

V2X2-reg is a register for registering the displacement of the finger controllable member in negative direction at the second speed level.

The formula used in the control program flow chart are defined in TABLE III as follows:

TABLE III formula 1. C1+C2=C
formula 2. Kn=(n−1)K2-(n−2)k1 n>=3, K2>K1
formula 3.(K1*C1)+(K2*C2)=the distance of the display
formula 4. Kn*VnXn+ . . . +K2*V2X2+K1*V1X1=display value
formula 5. VnXn+ . . . +V2X2+V1X1=the moving distance of the finger controllable element.

The VX represents the moving speed of the finger controllable member, changing among at least two different moving speeds, such as V1, V2, V3, and so on. Different proportional factor K is appointed to correspond to the different moving speeds. That is, the factor K is a constant representing that the displacement of the cursor moving on the display is proportional to the detected displacement of the finger controllable member on the effective area of the positioning device. For example, factors K1 and K2 may be various combinations, such as (1,2),(1,3),(1,4),(2,4), and so on, wherein the value of K1 and K2 may be a default value as a parameter for device driver program, which is selected by the user. It is therefore possible to determine the displacements C1 and X2 with reference to formula 1 and formula listed above, at both the first speed level and the second speed level. In a preferred embodiment, C1 and C2 may be a default parameter according to the resolution of the computer display used. When the resolution of the display is increased, the scale of the constant value K2 may be increased correspondingly, so that the cursor can be moved in a fine displacement operating mode which can match the minimum pixel displacement requirements of various display resolutions. In such case, due to K2 is increased in accordance with the increment of the display resolution; the minimum pixel displacement is correspondingly decreased. As result, the movement of the cursor on the display is very smooth.

Example:
Supposing that the display resolution at X-axis of the display is 640; the
Displacement of the photo encoder is about 15.68(i.e. 196*0.08 mm);
640=(1*C1)+(4*C2), K1=1,K2=4
196=C1+C2=C
C2=148,C1=48
In case that the display resolution at X-axis of the display is 1024;
1024=(1*C1)+(7*C2), K1, K2=7
196=C1+C2=C
C2=138, C1=58

When the display resolution is increased from 640 to 1024, the distance from pixel to pixel is decreased. So, in spite of K2 is changed from 4 to 7, it will not effect the smooth performance of the cursor moving on the display. In fine operation mode of the present invention, the cursor can be moved at precise displacement from pixel to pixel on the display, no matter the change of the display resolution. It is to be understood that the present invention can overcome the problem that the cursor move more than one sections when the finger controllable member only moves one section by decreasing the displacement C3 rather than changing the transparency of the photo encoder, comparing with the prior art, for example the section of the photo encoder is changed form 320 to 200 sections.

FIG. 7D is a subprogram flow chart of the control program, explaining how the cursor is moved to a positive direction, while FIG. 7E is a subprogram flow chart of the control program, explaining how the cursor is moved to the other direction, represented as H1 and H2 respectively in FIG. 7A. When the finger controllable member is moved in positive direction, the value stored in positive directional registers V1X1+reg and V2X2+reg will be increased. Correspondingly, the value stored in negative directional registers V1X1−reg and V2X2−reg will be decreased in accordance with the increment of the positive directional registers. When X-axis coordinate is minimum, the value stored in register V1X1+reg is 0, V1X1−reg is equal to value of C1, V2X2+reg is 0, and V2X2−reg is equal to value of C3; when X-axis coordinate is maximum, the value stored in register V1X1+reg is equal to value of C1, V1X1−reg is 0, V2X2+reg is equal to value of C2, and V2X2−reg is 0. The moved displacement of the finger controllable member at the third speed level is transferred to temporary values V1X1+ and V2X2+by using formulas 4 and 5 listed in TABLE III. Thereafter, the temporary values are stored in registers V1X1+reg and V2X2+reg respectively, and then the value of reference constant K3 may be calculated by using formula 2 listed in TABLE III. After these procedures, the finger controllable member may correctly return to original position, and the cursor on the display may also correctly return to original position.

For example:
K1=1, K2=4
K3=(n−1)K2-(n−2)K1
=(3−1)4-(3−2)1
=7

The result indicates that in case the displacement of the finger controllable member is equal 1, the movement of the cursor on display will be equal to 7. Then, the displacement of the finger controllable member at the third speed level may be transferred and stored in registers V1X1+reg and V2X2+reg by using formulas 4 and 5 listed in TABLE III.
K2*V2X2+K1*V1X1=display value
V2X2+V1X1=the moving distance of the finger controllable element
7*1=4*V2X2++V1X1+
1=V2X2++V1X1+
V2X2+=+2, V1X1+=−1

It is noted, in this case, the increment of V2X2+reg is 2, and the decrement of V1X1+reg is 1.

The result indicates that the value stored in registers V2X2+reg and V1X1+reg at positive direction (i.e., V2X2+reg +V1X1+reg =2+(−1)=1) is match the real displacement of the finger controllable member at the third speed level.

Further,
formula 3: (k1*C1)+(k2*C2)=the distance of the display
K1*V1X1+reg +K2*V2X2+reg=displacement of the display That is, (1*−1)+(4*2)=7

It indicates the same result that the displacement of the cursor on display is equal to 7 when the finger controllable member is moved at the third speed level. The displacement of the finger controllable member at the third speed level is transferred into temporary values V2X2+an V1X1+by formulas 4 and 5 listed in TABLE III, and then the temporary values are stored in registers V2X2+reg and V1X1+reg respectively.

It is obviously that the moving speed and positioning of the cursor on display may match that of the finger controllable member in accordance with the present invention, with advantage of smooth, fast, stable, and precise moving performance. The cursor positioning device of the present invention is provided with two positive directional registers and two negative directional registers. The value stored in the positive directional registers and the negative directional registers is always mutual associated, so that the finger controllable member may correctly return to original position and also the cursor may correctly return to original position correspondingly.

It is noted that the present invention adapts mutual association method by means of the positive directional registers and the negative directional registers. The definition of the positive directional registers and the negative directional registers is only for the purpose of better understanding. Alternatively, it is also possible to use two positive registers to achieve the same performance.

After the main program finishes the determination procedure in direction X+ as described above, the procedure determines whether VX is less than or equal to a predetermined reference speed in step F41 of FIG. 7D. If yes, it indicates the speed of the finger controllable member is less than a lower limit speed V1, i.e. the first speed level. In step F42, it further determines whether the value stored in register V1X1+reg of the first speed level is greater than or equal to a constant C1. If no, the displacement of the cursor is set to be proportional to that of the finger controllable member times a constant K1, and then in step F43 increasing the value of V1X1+reg, decreasing the value of V1X1−reg, and transmitting the value to computer. If the value stored in register V1X1+reg of the first speed level is greater than or equal to a constant C1, it indicates the V1X1+reg reaches a maximum value. In such a case, the displacement of the cursor will be set to be proportional to that of the finger controllable member times a constant K2, and then in step F46 increasing the value of V2X2+reg, decreasing the value of V2X2−reg, and transmitting the value to computer.

If the result in step F41 is no, it indicates that the finger controllable member is at an upper limit of the reference speed V1. In step F44, it further judges whether VX is at an upper limit or at a lower limit of the reference speed V2. In case VX is at an lower limit of V2, a step F45 is performed to judge whether the value stored in the register V2X2+reg is maximum value or not. If yes, the displacement of the cursor will be set to be proportional to that of the finger controllable member times a constant K1: if no, the displacement of the cursor will be set to be proportional to the displacement of the finger controllable member times a constant K2.

In case that only three speed levels are presented in the cursor positioning device, the terminal symbols A and B are combined together. In this case, if the result in step F44 is no, the step F47 is performed to read the left count remained in the positive register V2X2+reg. If the value of K2*V2X2−reg is less than of K3, the displacement of the cursor will be set to be proportional to that of the finger controllable member times a constant K2, and then the procedure flows to step F46 to avoid a situation that the cursor value exceeds over the display margin when the performing speed of the cursor positioning device exceeds that of the reference speed V2. This also avoids a problem that the cursor does not return to original position. If the result in step F47 is no, the step F48 is performed to judge whether the register V2X2+reg is greater than or equal to a maximum value. If yes, the displacement of the cursor will be set to be proportional to that of the finger controllable member times a constant K1; if no, it indicates that the register V2X2+reg remains left value and the displacement of the finger controllable member in positive direction at the third speed level can be transferred and stored in the register V1X1+reg and V2X2+reg. Then, in step F49, the procedure judges whether the amount of fine displacement in positive direction exceeds a half of the distance. If no, step F46 is performed to set the displacement of the cursor proportional to the displacement of the finger controllable member times a constant K2; if yes, the procedure flows to step F50, decreasing the value of V1X1+reg, increasing the value of V1X1−reg, adding the value of V2X2+reg by 2, decreasing the value of V1X1−reg, and subtracting the value of V2X2−reg by 2. Under this procedure, when the finger controllable member is operating at the third speed level, the register V1X1+reg remains a value that is half of the constant C1. As result, when the cursor is moved to any position on the display, there are fine displacements always around the position where the cursor present.

The speed parameter VX of the finger controllable member of FIG. 7D is divided into three speed levels, i.e. $0<VX<=V1$, $V1<VX<=V2$, and $VX>V2$. Alternatively, the speed parameter VX may be divided into two speed levels, still remaining good performance described above and applicable to the most procedures of FIG. 7D. In this alternative embodiment, if the answer in step F41 is no, the step F47 is performed, neglecting steps F44 and F45. It means that the speed levels V2 are set to be similar or the same value. So, the second speed level will be neglected when the finger controllable member judges the value of VX. In another embodiment, it is also possible to detect the situation of the cursor positioning device such as key switch 13a shown in FIG. 6, with amendment to the firmware. In such a design, the user simply clicks the switch to enable the cursor positioning device operating at the first speed level. If the user clicks the switch again, the cursor positioning device can operates at the third speed level. In the third speed level, it is permitted to move the cursor on the display in fast moving operation mode.

FIG. 7E is a subprogram flow chart of the control program, explaining how the cursor is moved to the other direction, the control flow of that is similar to that of FIG. 7D. may correctly return to original position correspondingly.

Figure 9A:
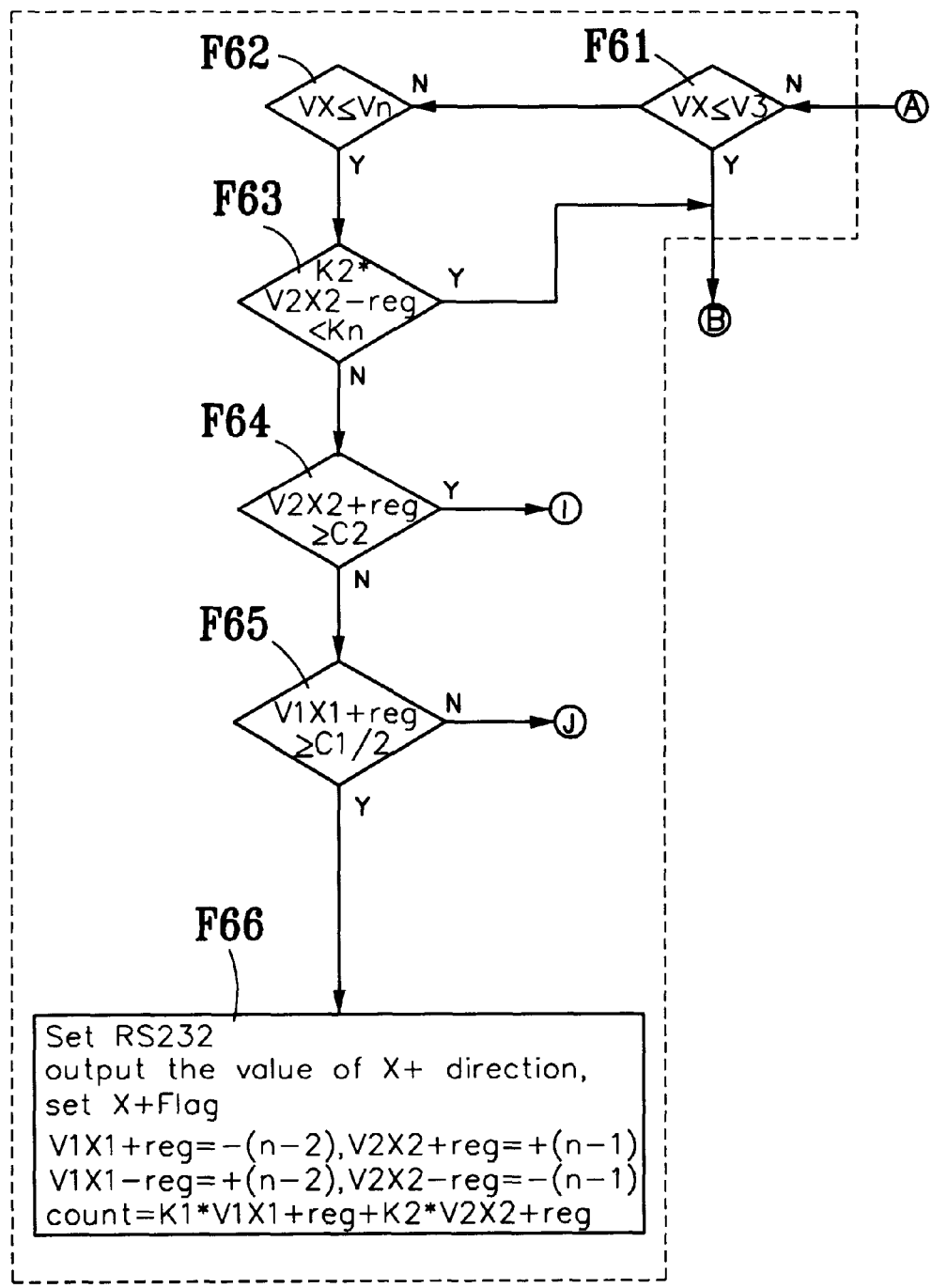
FIG. 9A is a subprogram of the block H1 of FIG. 7D
Figure 9B:
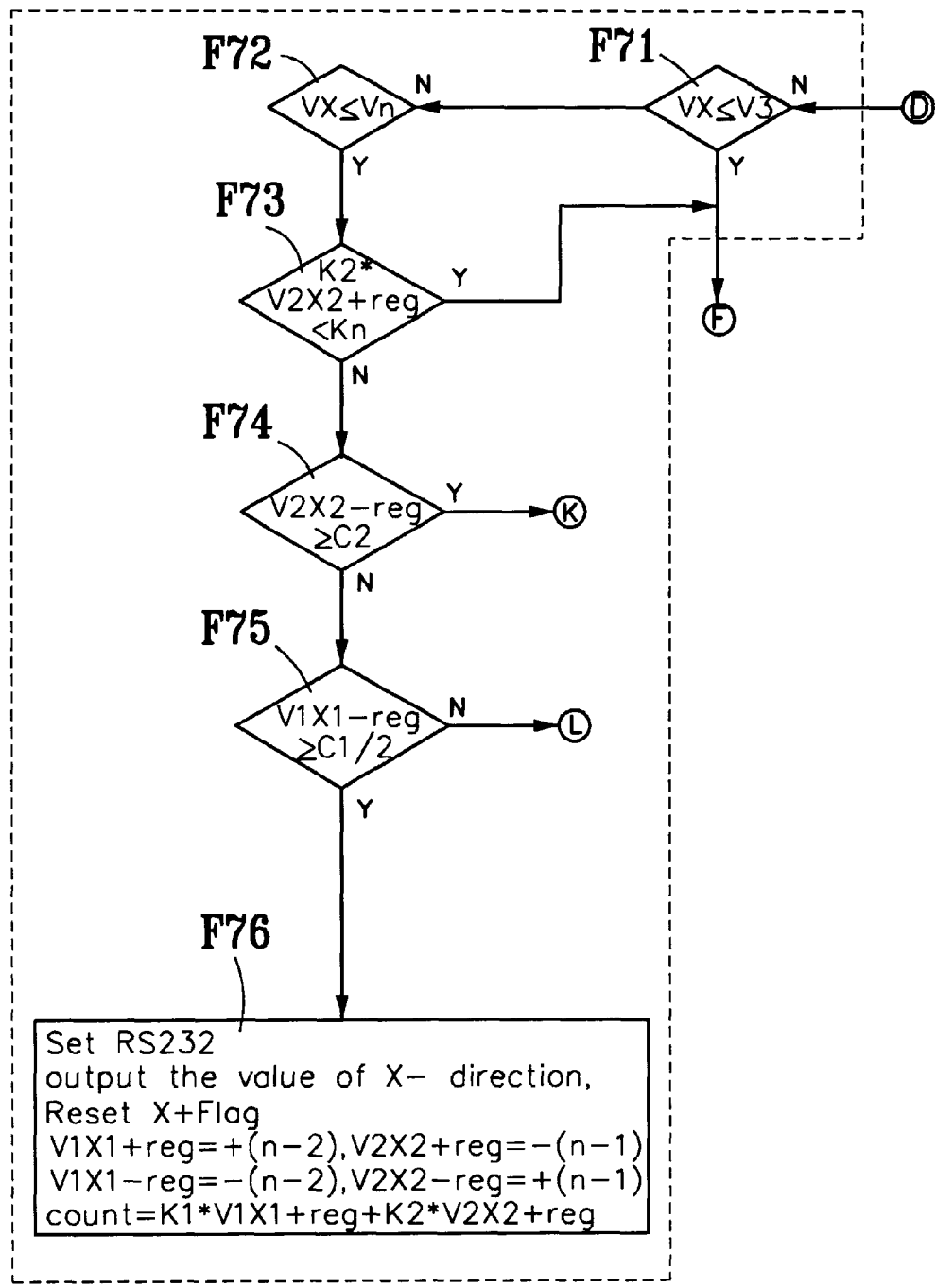
FIG. 9B is a subprogram of the block H2 of FIG. 7E
Figures 10A, 10B:
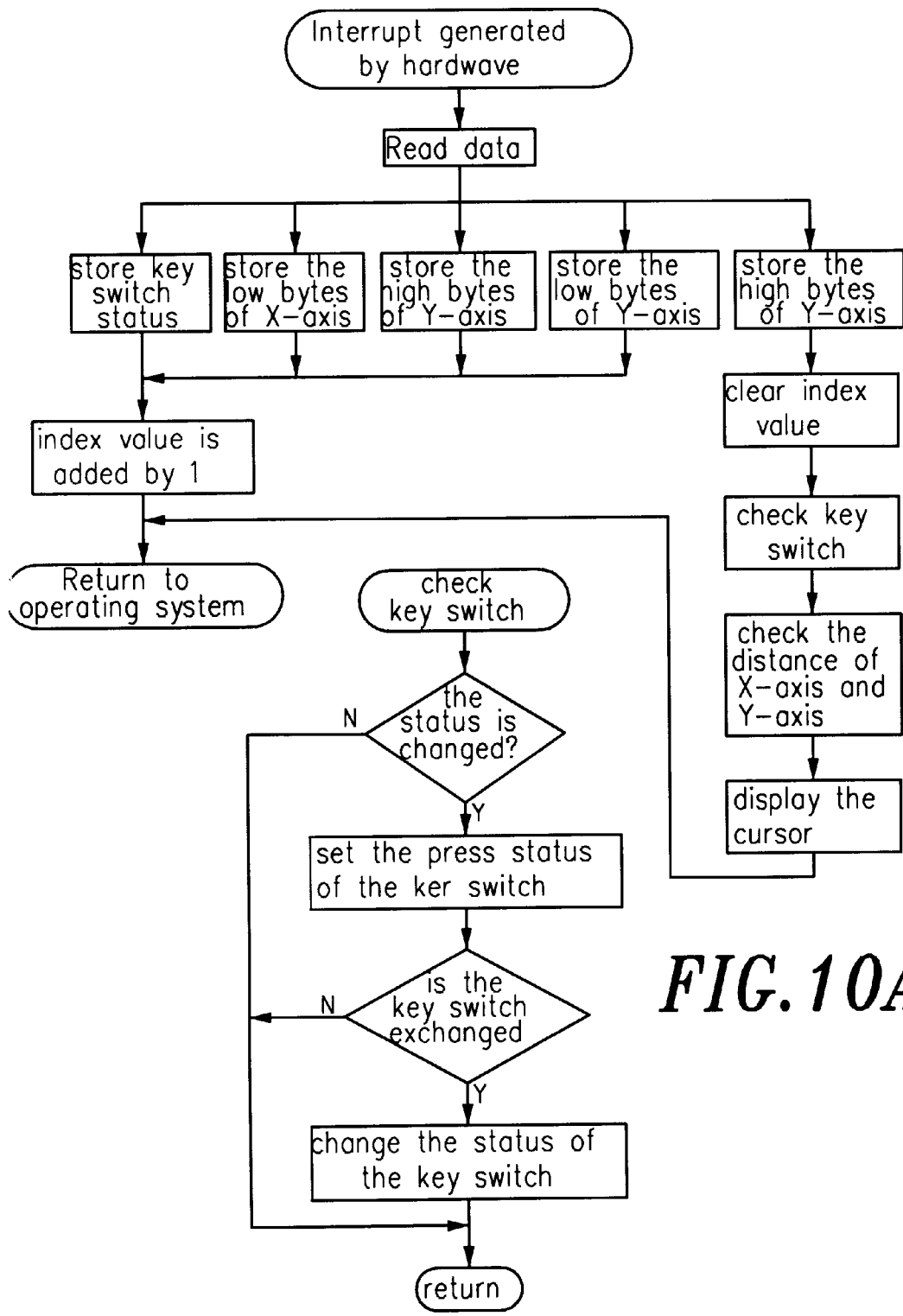
FIGS. 10A to 10D are controlling flow chart of the computer driving program.
Figures 10C, 10D:
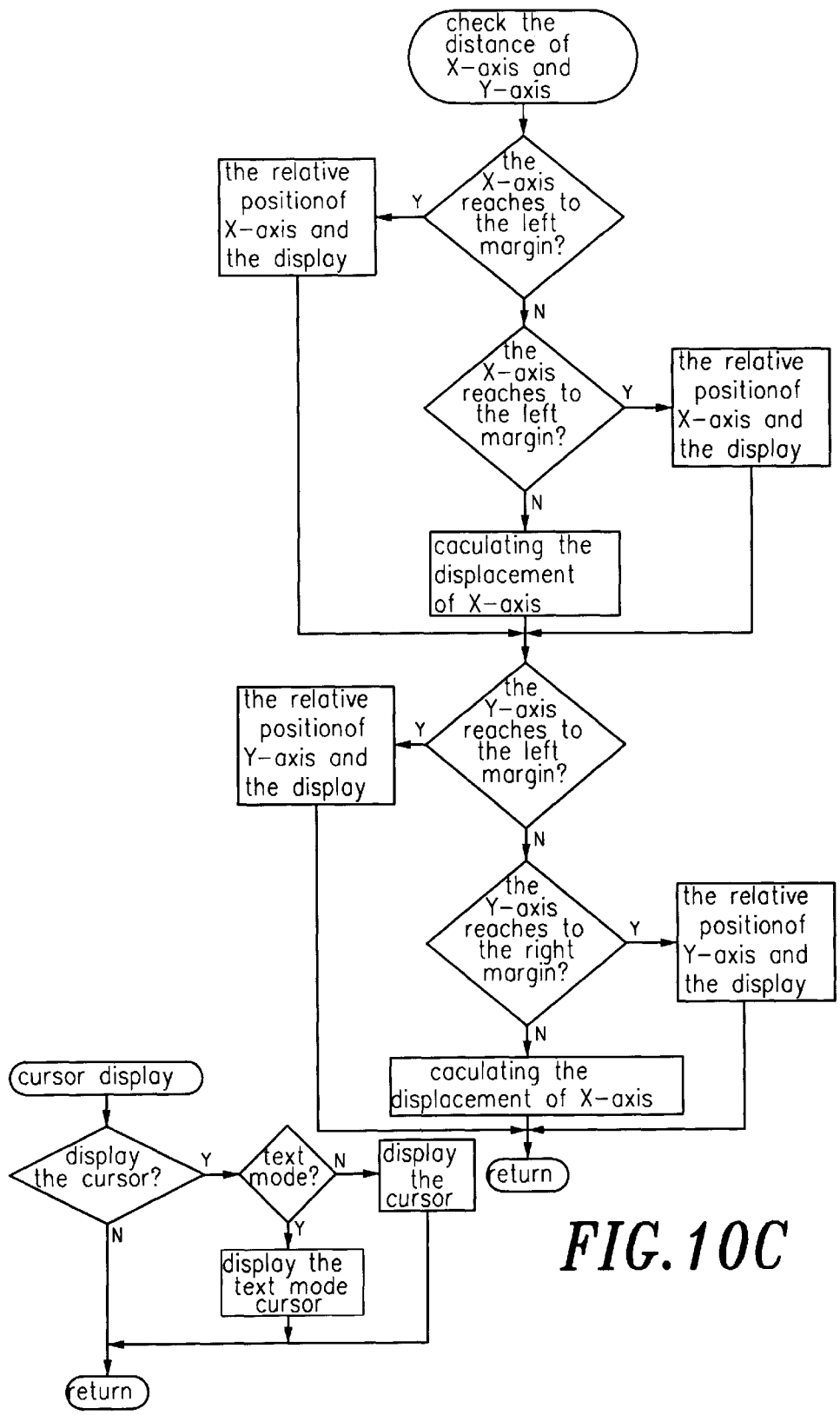

FIG. 9A is a speed detecting procedure in positive direction, including various speeds detecting subprograms. The terminals A and B are connected to corresponding terminals A and B of FIG. 7D. In case that the result in step F44 is no, the procedure flows to step F61 of FIG. 9A; if the result in step F61 is yes, the procedure flows to step F47 of FIG. 7D. It is noted that the speed VX in positive direction uses the same control procedure at the third speed level, the forth speed level, and higher speed level. In step F63, it detects whether the cursor is over the margin of the display. If yes, the speed will be changed to a lower speed level to further judge whether the cursor is over the margin again. The next step F64 is performed only until the cursor does not exceed the margin. In step F64, it judges whether the register V2X2+reg is a maximum value. If yes, the procedure returns to step F43; if no, the procedure flows to step 65. In step F65, it judges whether the register V1X1+reg is greater than a half of the value C1. If no, the procedure flows to step 46; if yes, the procedure returns to step F66. At this time, the high-speed value of the cursor poisoning device, for example at the third speed level or higher speed, is transferred into temporary values X2X2+ and V1X1+, and then storing the temporary values into the registers V2X2+reg and V1X1+reg respectively. As result, the moving speed and positioning of the cursor on display may match that of the finger controllable member with advantage of smooth, fast, stable, and precise moving performance. FIG. 9B is a speed detecting procedure in negative direction, the control flow of that is similar to that of FIG. 9A.

The Y-axis procedure is followed by the X-axis procedure, with similar control flow described above.

Figure 8:
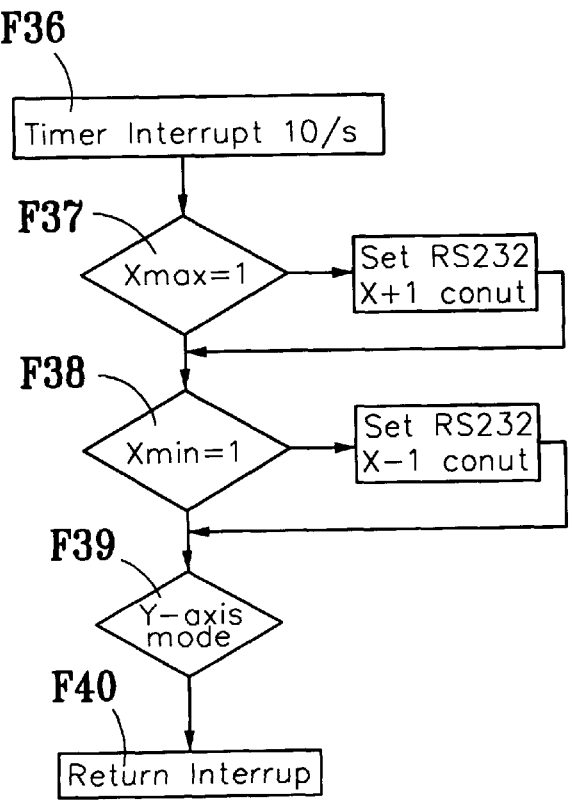
FIG. 8 is an interrupt program for margin determination.

FIG. 8 is an interrupt subprogram for margin determination. The procedure generates ten interrupt signals per second, and performs X-axis margin determination process and Y-axis margin determination process in sequence.

The arrangement and structure described above constitutes a preferred embodiment of this invention. It is to be understood that the present invention is not limited to this precise form and that changes may be made therein without departing from the scope and spirit of the invention as defined in the appended claim.

What is claimed is:

1. A cursor positioning method, comprising the steps of:
   (a) Providing a cursor positioning device for detecting movement of the finger and generating digital data;
   (b) Setting ratio constants K1, K2, . . . , Kn; setting maximum values C1, C2, . . . , Cn and initial values of registers V1X1, V2X2, . . . , VnXn corresponding to different speed sections, wherein n>=2;
   (c) Receiving digital data sent from the cursor positioning device;
   (d) Determining the speed of the data and which speed section the data corresponds to for each coordinate axis;
   (e) Adding the data value to the register corresponding to said speed section; and
   (f) Positioning the cursor based on the sum of the multiples of the respective ratio constants and values in registers as display value K1*V1X1+K2*V2X2+ . . . +Kn*VnXn.

2. A cursor positioning method as claimed in claim 1, wherein step (e) comprises the step of adding the data value to the register until a resultant value is at least equal to the maximum value and adding a remainder value to the other registers in any order.

3. A cursor positioning method as claimed in claim 1 or 2, further comprising the step of causing a data value in registers V1X1 approach to C1/2 when the speed of receiving data is within the higher speed section for each axis.

4. A cursor positioning method as claimed in claim 3, wherein the step is causing a data value in register V1X1 to approach C1/2 by adding N to register V1X1while subtracting N from the registers responding to higher speed section, wherein N is integer.

5. A cursor positioning method comprising the steps of:
   (a) Providing a cursor positioning device for detecting movement of the finger and generating digital data;
   (b) Setting ratio constants K1, K2, . . . , Kn; setting maximum values C1, C2, . . . , Cn and initial values of variables V1X1, V2X2, . . . , VnXn corresponding to different speed sections, wherein n>=2;
   (c) Receiving digital data sent from the cursor positioning device;
   (d) Determining the speed of the data and which speed section the data corresponds to for each coordinate axis;
   (e) Adding the data value to the variable corresponding to said speed section; and
   (f) Positioning the cursor based on the sum of the multiples of the respective ratio constants and variables as display value, K1 * C1+K2 * C2+ . . . +Kn * Cn.

* * * * *